United States Patent [19]

Hobrecht et al.

[11] Patent Number: 5,607,585
[45] Date of Patent: Mar. 4, 1997

[54] APPARATUS FOR FILTERING PLASTIC MELTS

[75] Inventors: Knut Hobrecht, Solingen; Jorg Alexander, Remscheid, both of Germany

[73] Assignee: Barmag AG, Remscheid, Germany

[21] Appl. No.: 503,108

[22] Filed: Jul. 17, 1995

[30] Foreign Application Priority Data

Jul. 15, 1994 [DE] Germany .......................... 44 25 108.4
Feb. 4, 1995 [DE] Germany .......................... 195 03 697.2

[51] Int. Cl.⁶ .................................................. B01D 29/60
[52] U.S. Cl. ........................ 210/316; 210/335; 210/338; 210/339; 210/433.1; 210/434; 425/199
[58] Field of Search ...................................... 425/195, 199; 210/316, 335, 338, 339, 433.1, 434, 441, 451, 455, 493.1

[56] References Cited

U.S. PATENT DOCUMENTS

| | | | |
|---|---|---|---|
| 3,481,473 | 12/1969 | Howard | 210/316 |
| 3,817,377 | 6/1974 | Piggott | 210/433.1 |
| 4,299,707 | 11/1981 | Neuman | 210/316 |
| 4,921,607 | 5/1990 | Langley | 210/323.2 |
| 5,456,828 | 10/1995 | Tersi et al. | 210/323.2 |

FOREIGN PATENT DOCUMENTS 0247468  12/1987  European Pat. Off. .

*Primary Examiner*—W. L. Walker
*Attorney, Agent, or Firm*—Bell, Seltzer, Park & Gibson, P.A.

[57] ABSTRACT

An apparatus for filtering plastic melts, which comprises a filter housing (1) having at least one cylindrical filter receiving chamber (8), and with a tubular filter cartridge (2) mounted in the chamber. An annular melt flow space (9) for the plastic melt is defined between the outer periphery of the filter and the inside wall of the chamber, such that the melt flows radially inwardly through the filter medium of the filter cartridge and into the central passage of the filter cartridge and then to an outlet opening of the housing. An additional melt flow outlet channel (12) is positioned adjacent the downstream end of the filter cartridge, and in one embodiment, the melt is able to flow via the additional melt flow outflow channel to the outside of the housing. In a second embodiment, the melt can flow via the additional melt flow outflow channel and an additional filter (11) and return to the main flow. The flow resistance of the additional melt outflow channel (12) is dependent only on the maximally acceptable residence time of the melt.

11 Claims, 2 Drawing Sheets

APPARATUS FOR FILTERING PLASTIC MELTS

BACKGROUND OF THE INVENTION

The invention relates to a filtering apparatus which is adapted for the filtration of a plastic melt.

Filtering apparatuses of the described type are disclosed in EP 0 247 468 A2, as well as in the treatise "Verbesserte Extrusion technologie durch Großflächen-Schmelzfiltration," Kunststoffe 70 (1980) 11, pp. 753–758. Such filtering apparatuses are typically constructed as large-surface filters employing hollow cylindrical filter elements, which are closed at one end and connected to the filter housing at the other end. The filtering apparatuses are commonly used in the processing of plastic melts, in particular in the production of yarns and films, as well as in the production of thin-walled extruded parts, so as to guarantee high quality products and an economical service life of molds and/or extrusion dies.

With the use of such filtering apparatuses, it is desirable to have identical residence times for the melts flowing through the filter, since the properties of the plastic melt change under the action of temperature and residence time. In the extreme case, these factors will lead to the decomposition of the plastic melt.

As is described in EP 0 247 468 A2, the filtering apparatuses may be hydraulically designed, so that no dead zones develop, if possible, in which the flow stagnates, and so that the melt obtains the same residence time over the entire filter surface. To this end, EP 0 247 468 A2 discloses that by means of the installation of displacers, it is possible to shorten the residence time and keep the residence time distribution within narrow limits. It is further known that the improvement of the melt feed through conical bores or contoured housings leads to a more favorable distribution of the residence time.

In practice, it has been found that with the use of tubular filter elements, which are commonly referred to as filter cartridges, it is possible to obtain approximately identical residence times over the entire filter surface. However, zones with longer residence times develop at the ends of the peripheral filter surface, since there the filter medium, such as wire mesh, metallic fiber web, etc., is compressed, so as to be connected at its one end to a metal ring, the so-called adapter, and at its other end to a metal cap.

In particular, filter cartridges consisting of a folded wire mesh, present edge zones with a higher flow resistance. Unduly long residence times occur primarily at the outlet end of the filter chamber.

Accordingly, it is the object of the invention to substantially eliminate dead zones, or even long residence times of the melt at the outlet ends of the filter chambers, where the filter cartridge is secured by means of an adapter to the end surface of the filter chamber.

SUMMARY OF THE INVENTION

The above and other objects and advantages of the present invention are achieved by the provision of a filtering apparatus which comprises a filter housing which includes at least one cylindrical filter receiving chamber therein, with the one filter receiving chamber defining an inner end wall and an opposite end wall. The filter housing further includes an inlet opening communicating with the inner end wall and an outlet opening communicating with the opposite end wall. A tubular filter cartridge is provided, which includes a central passage, a closed inner end, an open opposite end, and with the tubular filter cartridge being disposed in the one filter receiving chamber so as to define an annular space between the filter and the one chamber and so that the inlet opening communicates with the annular space and the central passage communicates with the outlet opening. The filter housing further includes an additional melt flow outlet channel communicating with the annular space at a location adjacent the opposite end wall of the one chamber.

In the preferred embodiment, an adapter is mounted to the open opposite end of the filter cartridge, and the adapter is in turn mounted to the opposite end wall of the filter receiving chamber by means of a tubular attachment. Also, the additional melt flow outlet channel is positioned between the adapter and the opposite end wall of the filter receiving chamber.

As a result of positioning the additional melt outflow channel adjacent the opposite end wall of the filter receiving chamber, and specifically between the filter adapter and the opposite end wall of the chamber, a melt flow forms that extends to the end of the chamber, so that melt accumulations with longer residence times, or even dead zones, are effectively avoided in the upstream filter cartridge. It is accomplished by the invention that the prevention of melt accumulations with a longer residence time, which leads to non-usable portions of the melt due to thermal decomposition, results in noticeable improvements in quality.

The hydraulic design of the additional melt outflow channel takes into account that only a certain residence time is acceptable. Therefore, high pressure gradients also permit a high flow resistance. At low pressure gradients, a low flow resistance ensures the necessary, constant outflow of the melt. Exclusively decisive for the design of the flow resistance of the additional melt outflow channel is the maximally acceptable residence time. Since the residence time which adjusts itself as a function of the flow resistances of the peripheral filter surface, is not identical with the maximally acceptable residence time, the flow resistance of the additional melt outflow channel may be smaller, equal to, or larger than the flow resistance of the peripheral filter surface.

In one embodiment of the invention, the additional melt flow outlet channel extends from the annular space to the outside of the filter housing, and the melt is collected outside of the filter housing. This is acceptable, in particular when the tolerable residence time is allowed to fall short due to a low outflow rate.

In another embodiment of the invention, the additional melt flow outlet channel extends from the annular space into the outlet opening of the filter housing. This embodiment may be used irrespective of the outflow rate, and the melt is thus returned, via an additional filter, into the main flow. The adaptation to the acceptable residence time may be effected in a very simple manner by exchanging and adapting the additional filter. The quality of the filtration will thus not be adversely affected. In this connection, it is of special importance that the maximally acceptable residence time will be longer in the region of the additional filter than the residence time that is presumed to exist in the regions of the filter cartridge. This embodiment has the special advantage that there will be no melt losses.

The additional filter, which is annular, may be positioned between the annular adapter and the opposite end wall of the chamber, such that the plastic melt flows from the annular space through the additional annular filter. This embodiment thus provides for an axial clamping of the additional annular filter against the filter element, as well as a sealing by the use of an intermediate ring, so that only the melt flowing through the annular melt feed space between the filter cartridge and the wall of the filter receiving chamber, passes through the additional filter.

To be able to use standardized filter cartridges, it is advantageous to provide the filter cartridge with a tubular attachment which is mounted between the open end of the filter and the opposite end wall. Preferably, the attachment is threadedly attached to the adapter and to a counterbore in the opposite end wall which communicates with the outlet opening. The attachment has a circular-cylindrical outer surface for receiving the additional filter, preferably with a small clearance therebetween. This allows the additional filter to be exchanged in a simple manner and/or to dimension it with respect to fineness irrespective of the filter cartridge. The filter cartridge may thus be threadedly secured to the filter housing via the attachment, so as to clamp the additional filter between the filter adapter and the opposite end wall of the filter receiving chamber.

The above embodiment also has the advantage that it permits standard filter cartridges to be joined to a screw-thread extension on the adapter, via an external thread, and to standard filter cartridges with an internal screw thread in the adapter.

When using a filtering apparatus having a filter housing with at least two chambers, each receiving one filter cartridge, the filter cartridges of the filter housing are attached in general to a common support plate. Preferably, the chambers of the filter housing extend into this support plate so far that the additional filters provided at the end extend at least in part into the support plate. The end of the chamber is preferably configured such that at least the cross section of the end portions of the annular melt feed space decreases continuously toward the opposite end wall. This avoids critical corners with melt accumulations.

In the embodiment of the invention using an additional filter, the filter material is preferably a sintered material. The selection of the sintered material and its pore size allow the flow resistance of the melt outflow to be changed in a simple manner.

All embodiments of the invention will perform especially advantageously, when filter cartridges with a folded peripheral filter surface are used. The folded peripheral surfaces of the filter have a well defined edge zone with a high flow resistance, since due to the large surface, it is necessary to compress a very great deal of filter medium, so as to connect the ends to the adapter and the cap.

The invention has proven itself in particular with the use of change filters, in that two or more filter units or filter systems are alternately operated in a continuous melt flow by two-way valve arrangements. Their use allows to increase in particular the service life of the filter cartridges and the length of the filtering times, before a filter change becomes necessary.

BRIEF DESCRIPTION OF THE DRAWINGS

Some of the objects and advantages of the invention having been stated, others will appear as the description proceeds, when considered in conjunction with the accompanying drawings, in which.

DETAILED DESCRIPTION OF THE PREFERRED EMBODIMENTS

Figure 1:
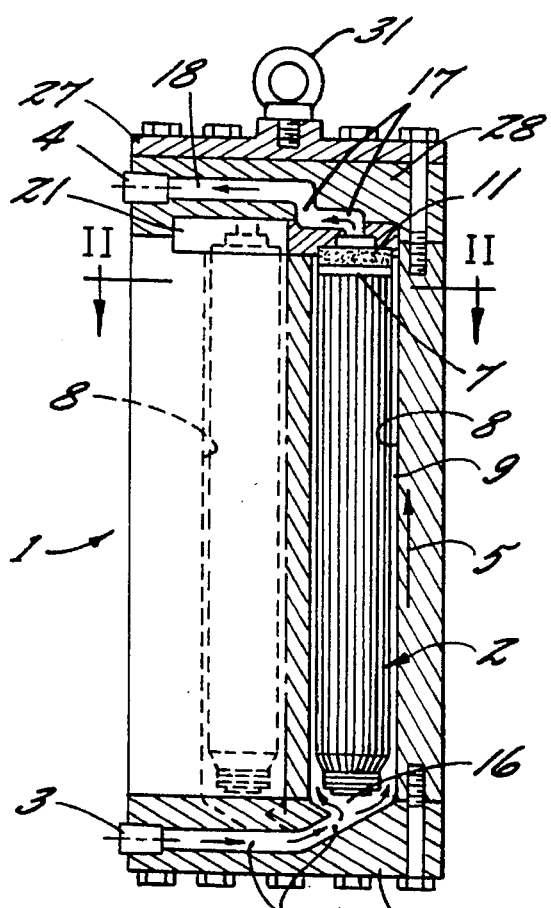
FIG. 1 is an axial sectional view of a filter housing for three filter cartridges in accordance with the present invention.
Figure 2:
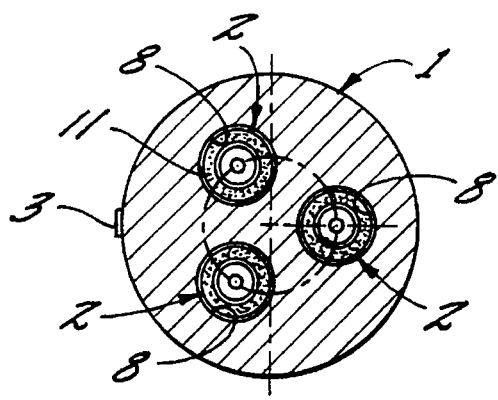
FIG. 2 is a cross sectional view along line II—II of FIG. 1.
Figure 3:
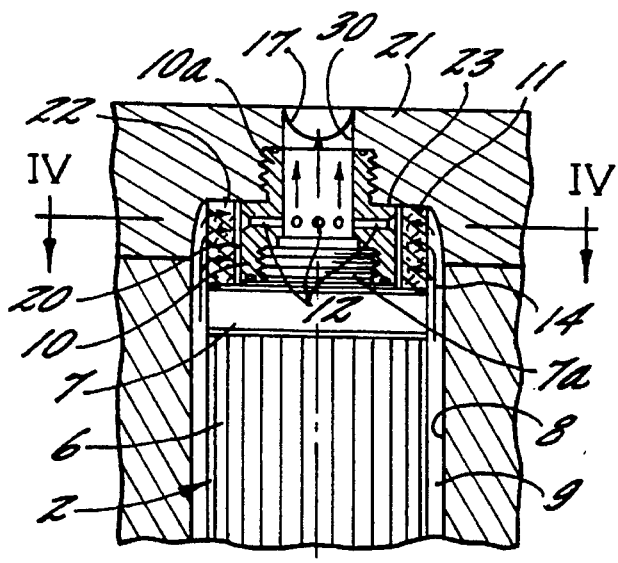
FIG. 3 is a partial lengthwise sectioned view of a filter chamber equipped with one filter cartridge.

Referring more particularly to FIGS. 1–3 of the drawings, a filtering apparatus is illustrated which comprises a filter housing 1 which includes three cylindrical filter receiving chambers 8 therein. Each chamber 8 includes an inner end wall which is defined by a base plate 29 of the housing, and an opposite end wall 23 which is defined by a support plate 21 which is supported by an intermediate plate 28 of the housing.

Each of the three chambers 8 accommodates a filter cartridge 2. The filter chambers 8 are constructed substantially cylindrically and dimensioned such as to leave around the peripheral filter surface of each filter cartridge 2 a substantially annular melt feed space 9 extending over the length of the filter cartridge 2, as well as to an additional melt outflow channel 12 with an additional filter 11. However, each chamber 8 is configured such that the additional melt outflow channel 12, which is positioned between a filter adapter 7 and the opposite end wall 23 at the outflow end of the chamber, communicates with the annular melt feed space 9.

The annular melt feed space 9 may have a constant cross section over its length. However, in one embodiment, the free cross section narrows, preferably continuously from the melt inflow opening to the melt outflow opening, and at least continuously in the region of the additional melt outflow channel 12 with the additional filter 11 toward opposite end wall 23 at the outlet end (FIG. 3).

Figure 2A:
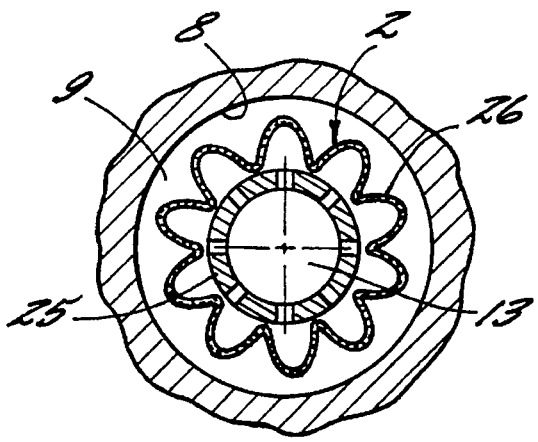
FIG. 2a is a cross sectional view of a filter chamber with a filter cartridge.
Figure 5:
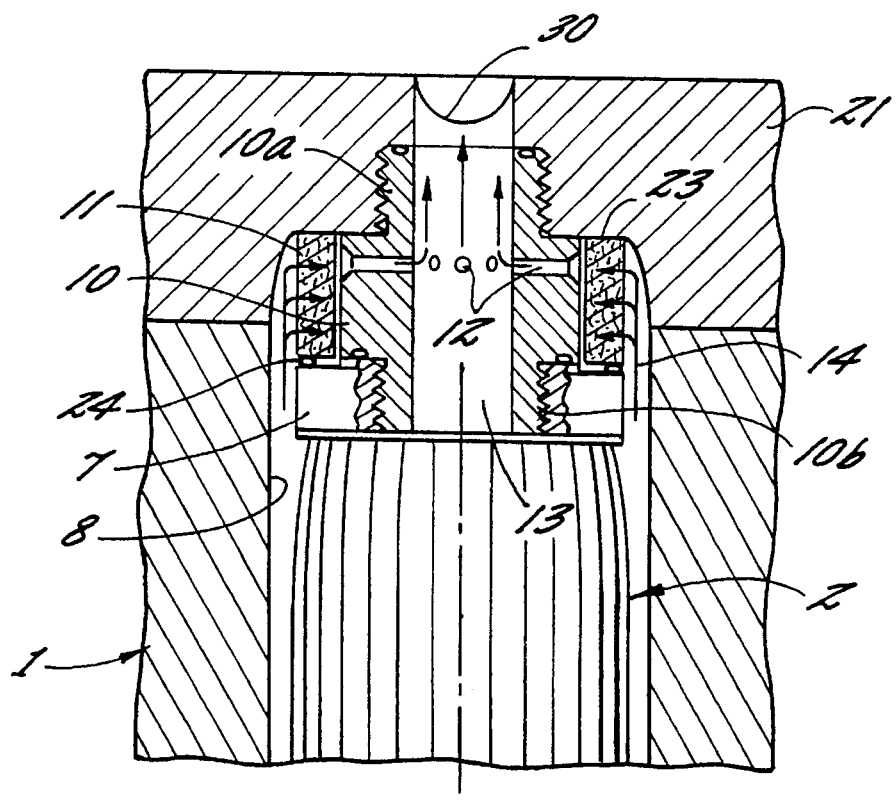
FIG. 5 is partial lengthwise sectioned view of a filter chamber equipped with one filter cartridge.

As can be noted from FIG. 2a, the filter cartridges are preferably made of a folded filter medium 26, with the folds running in the axial direction, and so as to obtain the largest possible peripheral surface. Used as filter media are such as a web of metallic fibers, wire mesh, or sintered materials. In the interior, the filter medium is supported on the periphery of a radially permeable support tube 25. The filtered melt flows through a melt collection central passage 13 to the outlet end. At the end of the filter cartridge, the folded filter material is contracted, thereby being compressed for attachment to the annular adapter 7 (FIG. 5).

Figure 4:
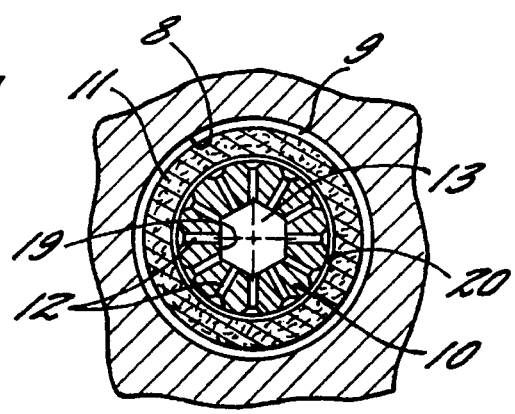
FIG. 4 is a cross sectional view along line IV—IV of FIG. 3.

As shown in FIG. 3, the filter cartridges 2 are upwardly closed by the annular adapters 7, which are radially impermeable, and which have screw-thread projections 7A which accommodate tubular attachments 10 for forming additional melt outflow channels 12 and for receiving additional filters 11. To this end, as shown in FIG. 5, the adapter 7 may also be joined by screwing to a screw-thread extension 10B of attachment 10. As best seen in FIG. 4, the attachments 10 are provided with radially extending melt outflow channels 12 which communicate both with the annular melt feed space 9 and with the melt collection central passage 13. Thus the melt is able to flow from the annular space 9 along a secondary flow path 14 (FIGS. 3 and 5) and which includes the filter 11 and the channels 12 in the attachment 10. The outside diameter of the attachment 10 is dimensioned such as to leave between the additional filter 11 and the circular-cylindrical peripheral surface 21 of the attachment an adequate clearance for distributing the melt passing through the additional filter.

The attachments 10 are provided with screw-thread extensions 10A, by which the mounted filter cartridges 2 are screwed to a support plate 21 common to the filter cartridges 2 accommodated in filter housing 1. The internal bores 13 of attachments 10 form preferably a hexagon 19 (note FIG. 4), so as to facilitate the screw connection with the support plate 21. The tool is therefore entered likewise via melt outlet opening 31.

As further shown in FIG. 1, the filter housing is closed at its lower end by the base plate 29. Machined out of base plate 29 and associated to filter chambers 8 are distribution chambers 16, which are connected via a melt distributor line 15 with a common melt inlet opening 3.

At its upper end, the filter housing 1 is closed by the cover 27 placed on the intermediate plate 28. Fitted between the body of the filter housing 1 and the intermediate plate 28 is the above-described common support plate 21. The melt leaving the filter cartridges 2 through their central passages 13, enters, via melt outflow opening 30 and melt collecting channel 17 which is, in the illustrated embodiment, machined in part out of the upper side of support plate 21 and in part out of the underside of intermediate plate 28, into a common outlet channel 18 and leaves the housing through a common outlet opening 4.

The base plate 29 on the one hand and the cover 27 together with intermediate plate 28 on the other hand are bolted respectively in pressure tight manner to the filter housing 1 by the indicated bolts. A carrier ring 31 which is threaded into the cover allows the assembled filter housing to be handled by suitable hoisting equipment, or upon loosening a portion of the peripherally distributed, elongate bolts, it is possible to axially pull out the filter cartridges 2 from their respective chambers 8.

As regards additional filter 11, it should be noted that same is constructed as an annular body, and consists of a sintered material having a particle size or grain size fraction, or a mixture of such fractions, as is selected for the manufacture of filter elements. The size of the permeability or porosity determines the flow resistance of the melt outflow. This size is adjusted, so that it just falls short of the maximally acceptable residence time of the melt.

Figure 6:
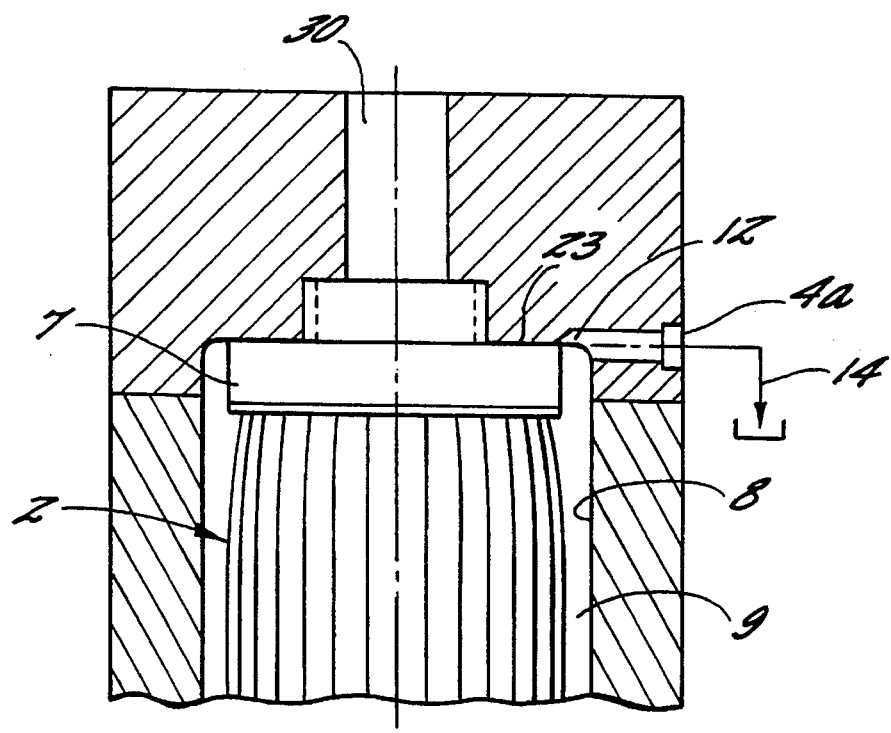
FIG. 6 is a partial lengthwise sectioned view of a filter chamber equipped with one filter cartridge.

The embodiment shown in FIG. 6, includes on the outlet side, at the end of filter chamber 8, an additional melt outflow channel 12 arranged in the wall of filter chamber 8. This melt outflow opening 12 connects the annular melt feed space 9 with a separate outlet opening 4A, so as to permit the secondary melt flow 14 to be diverted and collected outside of filter housing 1. The flow resistance is determined by the size of the outlet opening.

In the drawings and the specification, there have been set forth preferred embodiments of the invention and, although specific terms are employed, the terms are used in a generic and descriptive sense only and not for purpose of limitation, the scope of the invention being set forth in the following claims.

That which is claimed is:

1. A filtering apparatus adapted for the filtration of a plastic melt and comprising a filter housing (1) which includes at least one cylindrical filter receiving chamber (8) therein, with said one filter receiving chamber defining an inner end wall and an opposite end wall (23), said filter housing further including an inlet opening (3,15) communicating with said inner end wall and an outlet opening (4,30) communicating with said opposite end wall, a tubular filter cartridge (2) which includes a central passage (13), a closed inner end, an open opposite end, and with said tubular filter cartridge being disposed in said one filter receiving chamber so as to define an annular space (9) between said filter cartridge and said one chamber and so that said inlet opening communicates with said annular space and said central passage communicates with said outlet opening, adapter means mounting said open opposite end of said filter cartridge to said opposite end wall of said one chamber, said adapter means including a radially impermeable annular adapter (7) which is mounted to said open opposite end of said filter cartridge, said filter housing further including an additional melt flow outlet channel (12) communicating with said annular space at a location adjacent said opposite end wall of said one chamber, said additional melt flow outlet channel being positioned between said adapter and said opposite end wall of said one chamber, and an additional annular filter (11) positioned between said annular adapter and said opposite end wall and such that the plastic melt is adapted to flow from said annular space through said additional annular filter and to said additional melt flow outlet channel.

2. The filtering apparatus as defined in claim 1 wherein said apparatus further comprises a tubular attachment (10) mounted between said annular adapter and said opposite end wall (23) of said one chamber, with said attachment including a central opening extending axially therethrough which communicates with said central passage of said filter cartridge and with said outlet opening, and wherein said additional melt flow outlet channel extends radially through said attachment.

3. The filtering apparatus as defined in claim 2 wherein said attachment is a separate constructional element which is threadedly attached to said adapter and threadedly attached in a counterbore in said opposite end wall (23) which communicates with said outlet opening (4,30).

4. The filtering apparatus as defined in claim 3 wherein said opposite end wall (23) is defined by a support plate (21) and wherein the support plate includes an annular recess therein which forms a portion of said one filter receiving chamber (8) and effectively lengthens the same.

5. The filtering apparatus as defined in claim 4 wherein said recess in said support plate is configured such that the cross section of said one filter receiving chamber (8) decreases continuously toward said opposite end wall (23).

6. The filtering apparatus as defined in claim 1 wherein said additional melt flow outlet channel extends from said annular space to said outlet opening of said filter housing.

7. The filtering apparatus as defined in claim 1 further comprising a gasket (24) positioned between said adapter (7) and said additional filter (11).

8. The filtering apparatus as defined in claim 1 wherein said additional filter comprises a sintered material.

9. The filtering apparatus as defined in claim 1 wherein said tubular filter cartridge comprises a folded filtering medium, with the folds running in a direction extending between the ends of the filter cartridge.

10. The filtering apparatus as defined in claim 1 wherein said additional melt flow outlet channel extends into communication with said outlet opening.

11. A filtering apparatus adapted for the filtration of a plastic melt and comprising a filter housing (1) which includes at least one cylindrical filter receiving chamber (8) therein, with said one filter receiving chamber defining an inner end wall and an opposite end wall (23), said filter housing further including an inlet opening (3,15) communicating with said inner end wall and a first outlet opening (4,30) communicating with said opposite end wall, a tubular filter cartridge (2) which includes a central passage (13), a closed inner end, an open opposite end, and with said tubular filter cartridge being disposed in said one filter receiving chamber so as to define an annular space (9) between said filter cartridge and said one chamber and so that said inlet opening communicates with said annular space and said central passage communicates with said first outlet opening, said filter housing further including an additional melt flow outlet channel (12) communicating with said annular space at a location adjacent said opposite end wall (23) of said one chamber, said additional melt flow outlet channel extending directly from said annular space to a second outlet opening (4A) at the outside of said filter housing, so as to permit a primary melt flow from the annular space through the filter cartridge and to the first outlet opening and a secondary melt flow from the annular space through the additional melt flow outlet channel to said second outlet opening.

\* \* \* \* \*